(No Model.)
J. F. FISCHER.
APPARATUS FOR JOINTING PIPES.
No. 436,915. Patented Sept. 23, 1890.
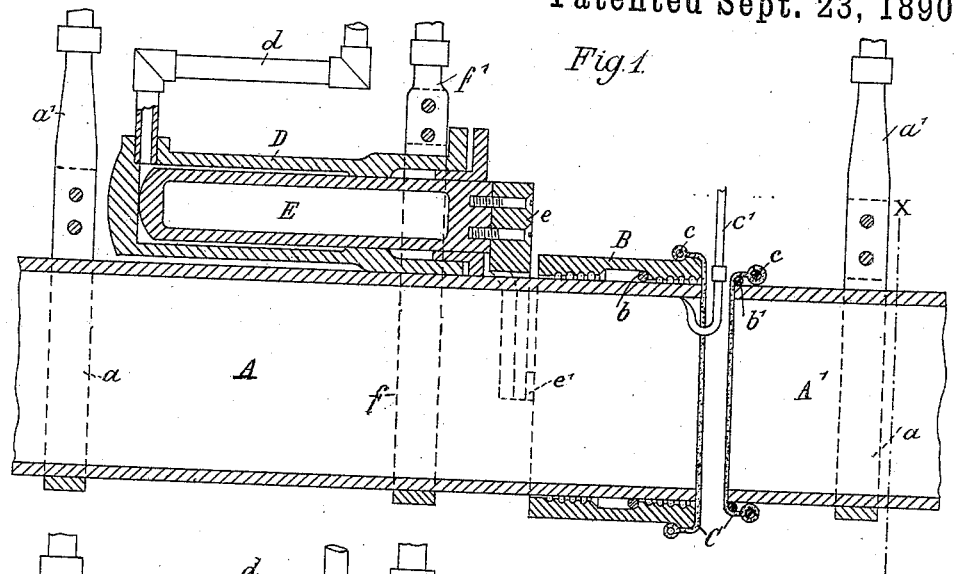
Fig. 1.
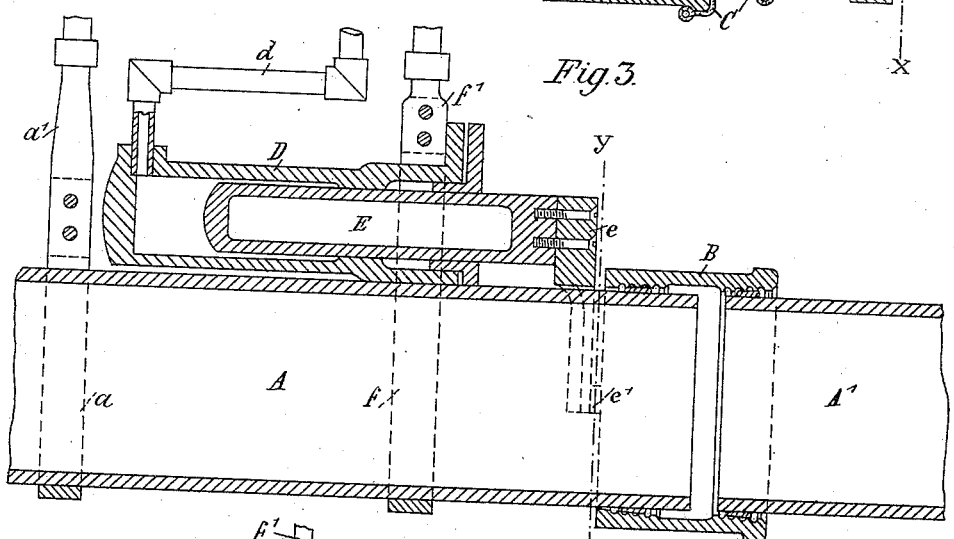
Fig. 3.
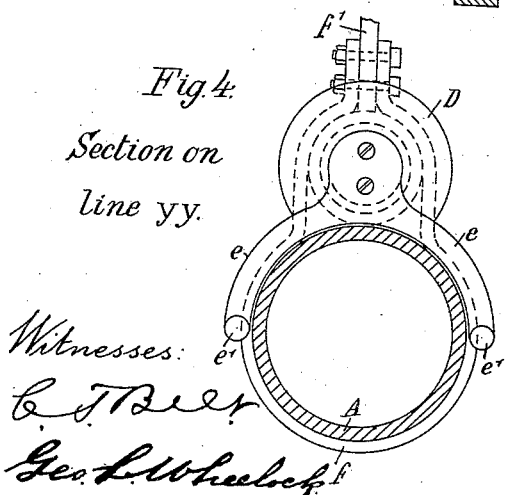
Fig. 4. Section on line yy.
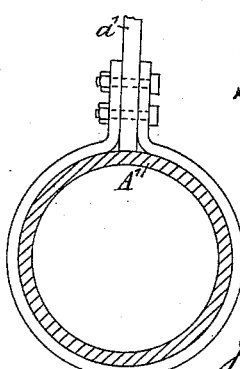
Fig. 2. Section on line xx.
Witnesses:
C. T. Bell
Geo. L. Wheelock
Inventor
J. F. Fischer
by Herbert W. T. Jenner
Attorney
THE NORRIS PETERS CO., PHOTO-LITHO., WASHINGTON, D. C.

UNITED STATES PATENT OFFICE.

JOHANN FRIEDRICH FISCHER, OF WORMS, GERMANY.

APPARATUS FOR JOINTING PIPES.

SPECIFICATION forming part of Letters Patent No. 436,915, dated September 23, 1890.

Application filed March 13, 1890. Serial No. 343,733. (No model.)

*To all whom it may concern:*

Be it known that I, JOHANN FRIEDRICH FISCHER, a subject of the Duke of Saxe-Coburg-Gotha, residing at Worms, in the Grand Duchy of Hesse, and German Empire, have invented certain new and useful Improvements in the Method and Apparatus for Jointing Pipes; and I do hereby declare the following to be a full, clear, and exact description of the invention, such as will enable others skilled in the art to which it appertains to make and use the same.

This invention relates to apparatus for jointing the ends of pipes; and it consists in the novel construction and combination of the parts and in the method of jointing the pipes, as hereinafter fully described and claimed.

In the drawings, Figure 1 is a longitudinal section through the ends of two pipes and the apparatus for jointing them together. Fig. 2 is a cross-section through one of the pipes, taken on line $x\ x$ in Fig. 1. Fig. 3 is a longitudinal section similar to Fig. 1, but shows the two pipes after they have been jointed together. Fig. 4 is a cross-section through one of the pipes taken on the line $y\ y$ in Fig. 3.

This invention is specially intended for use in connection with the apparatus for laying pipes in wet ground for which I have filed an application for Letters Patent of July 5, 1889, Serial No. 316,628.

A and A' are the ends of the two pipes which have to be jointed together. These pipes are supported by means of the straps $a$ and the rods $a'$, and have previously been brought into line with their ends near to each other, as shown in the drawings, by means of the apparatus described in the aforesaid application or any other equivalent apparatus. The pipes may be wholly supported by the rods $a'$, or they may be partially or wholly supported by the earth underneath them.

B is a double-ended thimble for coupling the two pipe ends in connection with the two rings of elastic material $b$ and $b'$.

C are caps of porous material—such as fine wire-gauze—which are temporarily secured over the ends of the pipes and thimble by means of the rings $c$ of elastic material. These caps are used when the pipes are being laid in very wet soil to prevent the entrance of sand and earth into the ends of the pipes; but the porosity of the caps permits the water to pass through them, so that the pressure is equal upon both sides of the cap. The thimble is slid upon the end of one pipe A with the ring $b$ inside it and on the pipe, and the ring $b'$ is slipped over the end of the other pipe A', as shown in Fig. 1. The porous caps are then removed by means of the hook $c'$, provided with a suitable handle for manipulating it, or by any other convenient device. The thimble is then forced forward onto the end of pipe A', as shown in Fig. 3. The rings $b$ and $b'$ are inclosed between the ends of the thimble and the ends of the pipes and form the joints.

I do not confine myself to the form of pipe ends and thimble shown, as the same apparatus may be used for jointing pipe ends and thimbles of different forms.

The apparatus I prefer to use for forcing the thimble over the pipe end consists of the hydraulic cylinder D, provided with a supply-pipe $d$.

E is the piston, and $e$ is a semicircular head secured centrally to said piston and straddling the pipe behind the thimble. The head $e$ is provided with buffers $e'$, which bear against the end of the thimble upon opposite sides of the center. The cylinder D is clamped to pipe A by the strap $f$ and is supported by the rod $f'$.

When the caps have been removed, liquid is pumped into the cylinder through the pipe $d$, and the piston is forced outward until the thimble is slid into the position shown in Fig. 3.

What I claim is—

1. The apparatus for jointing pipes, which consists of removable caps of perforated material adapted to be temporarily secured over the open ends of the pipes, and a hydraulic press attached to one pipe and adapted to force the thimble onto the end of the other pipe after the pipes have been aligned under water and the said caps removed from their adjacent ends, substantially as set forth.

2. The apparatus for jointing pipes under water, which consists of a hydraulic press, a semicircular head centrally secured to the press-piston and provided with buffers at each end for bearing against the end of the sliding thimble, and a removable clamping device for securing the press to the end of one pipe while the said thimble is being forced onto the end of the other pipe, substantially as set forth.

In testimony whereof I affix my signature in presence of two witnesses.

JOHANN FRIEDRICH FISCHER.

Witnesses:
    JULIUS STRAUSS,
    ADOLPH ZACOBI.